(12) United States Patent
Okamoto

(10) Patent No.: US 6,246,714 B1
(45) Date of Patent: Jun. 12, 2001

(54) SYNCHRONIZATION CIRCUIT WITH CORRELATED SIGNAL IN THE DIRECT SPREAD SPECTRUM TELECOMMUNICATION SYSTEM

(75) Inventor: Naoki Okamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/053,044

(22) Filed: Apr. 1, 1998

(30) Foreign Application Priority Data

Apr. 8, 1997 (JP) .................................... 9-089533

(51) Int. Cl.⁷ ................................ H04L 27/30; H04J 3/06
(52) U.S. Cl. .................. 375/142; 375/367; 375/145; 375/150; 370/509; 370/515
(58) Field of Search ................................. 375/367, 354, 375/142, 140, 145, 147, 149, 150; 370/342, 324, 350, 479, 509, 515, 503

(56) References Cited

FOREIGN PATENT DOCUMENTS

| 9-55714 | 2/1997 | (JP) . |
| 9-270735 | 10/1997 | (JP) . |
| 9-298491 | 11/1997 | (JP) . |

*Primary Examiner*—Stephen Chin
*Assistant Examiner*—Betsy L. Deppe
(74) *Attorney, Agent, or Firm*—Nixon & Vanderhye P.C.

(57) ABSTRACT

A synchronization circuit with correlated signal is capable of generating synchronizing signals to provide a stable correlated signal when correlation processing is conducted by digital sampling and/or even when multiplexing is conducted and a low spread factor is preset in the direct spread spectrum telecommunication system. A discriminator compares a correlated signal represented by the root of the sum of the squares of the input signals with a predetermined threshold. A processing unit generates a signal when an output which does not exceed the threshold in a unique delay interval preset in a multiplexing block so that one output signal is obtained in one period of spreading. An initial synchronization circuit establishes a synchronization relationship between signals from the processing unit. A synchronization counter causes either of a correct lock counter or error lock counter to operate via a determining unit to synchronizing pulses in a synchronization relationship with correlation. A system for coping with a system for taking a given number of samples per one chip may be added.

9 Claims, 17 Drawing Sheets

I SIGNAL

Q SIGNAL $\sqrt{I^2 + Q^2}$
$\begin{pmatrix} \text{ROOT OF SUM} \\ \text{OF SQUARES} \end{pmatrix}$

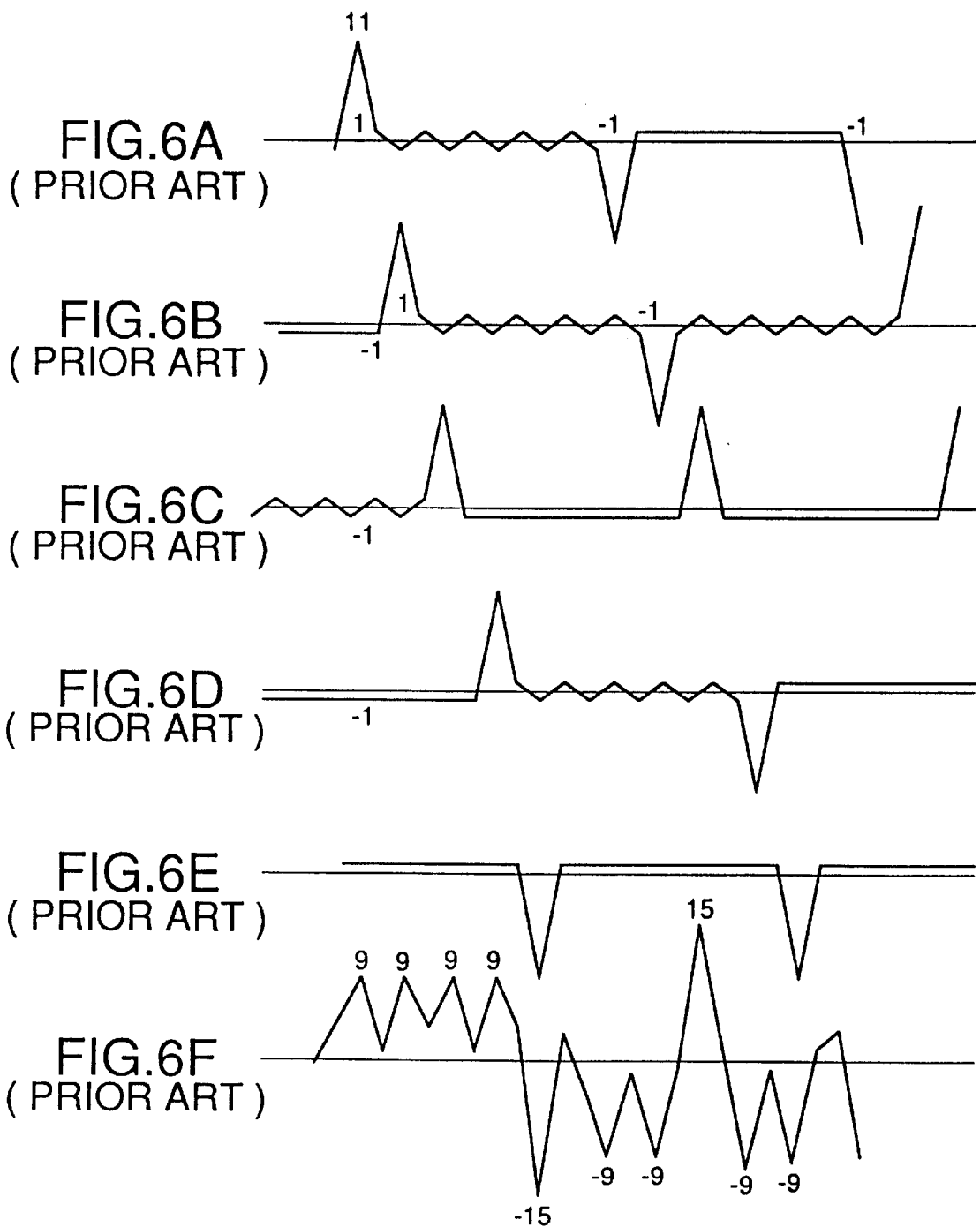

SYNCHRONIZATION CIRCUIT WITH CORRELATED SIGNAL IN THE DIRECT SPREAD SPECTRUM TELECOMMUNICATION SYSTEM

BACKGROUND OF THE INVENTION

The present invention relates to a spread spectrum telecommunication and in particular to a synchronization circuit with correlated signal used in the spread spectrum telecommunication using a direct spreading method.

The spread spectrum telecommunication has been recently put into practice and has an advantage over general narrow-band telecommunication in that it has a high immunity from multi-path and/or non-white noise.

In a system for accomplishing such direct spread spectrum telecommunication, it is necessary to conduct a spreading and despreading operations in the modulation and demodulation stages, respectively.

In an example of a receiver in such a system, a received incoming signal is converted from a RF (radio frequency) signal to an IF (intermediate frequency) signal. By processing circuits for processing the signal after it has been converted into IF signal, the IF signal is split by means of a splitter into two signals, which are then multiplied with a cosine and sine components of a local signal from a local oscillator by means of multipliers, respectively. Signals from the multipliers are input to two correlators as an I and Q signals of respective base band components, respectively. These correlators have codes which are preset to correlate with spread codes which have been spread by a transmitter. A correlation relationship between the present codes with the spread codes is established in the correlators so that I and Q correlated signals are output therefrom, respectively.

Thereafter, they are demodulated in demodulating units. At this end, it is necessary to input the I and Q correlated signals to the demodulating unit in synchronization of the correlated signals. The circuit for this synchronization is referred to as synchronizing unit with correlated signals.

In order to establish a synchronization relationship, a root of the sum of the squares of the outputs from I and Q correlators is determined by a root-of-sum-of-squares circuit to provide an output of the absolute value of the correlated signals.

The correlated signals represent signals in the form of spike, which are generated in a timing of high correlated relationship. These signals are referred to as correlation spikes. The correlation outputs of the I and Q signals per se assume values which are on curves represented by positive and negative sine and cosine functions. The root of the sum of the squares, that is $\sqrt{I^2+Q^2}$ assumes a constant value at its peak. This is due to the fact that there is a relation $\sin^2\theta + \cos^2\theta = $ constant.

Accordingly, the synchronization circuit with correlated signals synchronizes with a desired signal by using a signal representing the root of the sum of the squares to provide synchronizing pulses.

A synchronization circuit with correlated signals which is similar to the frame synchronizing system of the general digital wireless telecommunication system is used as the synchronization circuit with correlated signals of the above-mentioned direct spread telecommunication system.

The synchronization circuit used for the general frame synchronization circuit is disclosed in, for example, 田中公男(Kimio Tanaka) "デジタル通信技術(Digital Telecommunication Technology)", published by 東海大学出版(Tokai University Publishing Association).

There's a synchronization circuit with correlated signals in a receiver of the prior art spread spectrum telecommunication system, which is similar to the synchronization circuit for the general frame synchronization, which is exemplified above.

The prior art synchronization circuit with correlated signals comprises a discriminator, initial synchronization circuit, synchronizing counter, AND circuits, error lock counter, correct lock counter and so on.

In this synchronization circuit with correlated signals, the discriminator compares the correlated signal C which is obtained as the root of the sum of the squares with a predetermined threshold. If the correlation signal C exceeds the threshold, the discriminator determines that the correlation is so high that the signals are synchronized for generating synchronizing pulses (correlated signal detection pulses) SP.

The initial synchronization circuit confirms that several detection pulses have been consecutively generated at positions of the correlation spikes (each period of code) and enables the synchronization counter to operate after determining that the initial synchronization is achieved.

This causes the synchronization counter to individually count the synchronization of the next correlation spikes.

An AND logical operation between the output of the synchronization counter and the correlation pulse SP from the discriminator is conducted by an AND circuit.

If the signals are synchronized with each other at appropriate positions, signals would be generated from the synchronization counter in a timed relationship in which next correlation spike would be generated when considering the initial synchronization timed relationship. On the other hand, the correlation detection pulses SP are generated at positions of correlation spikes. Agreement between two signals is determined by the AND circuit. When they agree, the circuit generates a count pulse CP for counting up the correct lock counter.

Since the two signals do not agree when the initial synchronization is erroneous, the circuit counts up the error lock counter. If the initial synchronization is appropriately conducted in such a manner, a correct synchronization with correlation would be kept. If it is improperly conducted, the error lock counter would exceed a preset value to determine that it is in an erroneous synchronization relationship for resuming the initial synchronization relationship.

As mentioned above, in the prior art, a determination was made based upon a threshold whether correlation outputs are correlated to each other and it is determined that there is a correlation therebetween if the correlation output exceeds the threshold.

The difference of the outputs between the case in which a correlation is established and the case in which no correlation is established is large when the spread factor is high. Recently, spread code having a spread factor which is in order of about 10 may be used. In this case, the output difference between the above-mentioned cases would be small.

Even if the number of samples is increased in view of a low spread factor, the increase in scale of the circuits such as correlator and the like is less. Accordingly, the number of samples may be increased from two samples per one chip to three or four samples per one chip.

There exemplifies sample points in a period of time when the correlation value along a correlation output curve in its upper part exceeds the threshold. Three samples and five samples exceed the threshold for during one correlation spike due to the fact that the spread factor is low and the number of samples is increased in cases of three samples per one chip and five samples per one chip. The prior art circuit has a drawback that the sample which previously exceeds the threshold would be synchronized so that a sample which does not correspond to higher correlation spike is synchronized.

A multiplexing system in the spread spectrum communication is disclosed in Japanese Patent Application No. 7-206159, the inventors and applicant of which are identical to those of the present application, respectively.

There will be described a transmitter system in the multiplexing system.

A data signal is differentially coded by a differential coding unit and then converted into four parallel signals P1 to P4 by a serial/parallel converter.

The parallel signals P1 to P4 are multiplied by spread codes from a PN generator by multipliers to provide independent spread signals M1 to M4, respectively. After the signals M1 to M4 are differently delayed by delay elements, respectively, they are mixed by a mixer and then the mixed signal is modulated by a multi-value modulator having an local oscillator and is frequency-converted by a frequency converter and is transmitted to air after being amplified by a power amplifier. This causes a number of signals which are serial/parallel converted to be multiplexed for transmission. Although the signal is converted into four parallel signals, the number of the signals may be optionally preset when the number of signals to be multiplexed is preset.

A case in which the thus transmitted signal is received and is passed through the correlator will be considered.

Since the multiplexed signals are the sum of individual independent signals, the output from the correlator is the linear sum of the outputs which are obtained when respective signals are passed through the correlator.

There exemplifies a case of multiplexing of 5 signals unlike that of 4 signals. The Barker code of 11 chips is used as a spread code.

In this case, the correlation value largely varies in a range of 7 to 15 (absolute value).

Accordingly, it is necessary to decrease the threshold so that the correlation value exceeds the threshold even when it is 7. By do so, the correlation value exceeds the threshold over several samples when it assumes 15. There is the higher risk that erroneous synchronization may occur than the previous case.

Another problem which may occur in the prior art will also be described.

It is assumed that a correlation flag be set at the position where the correlation is highest.

In this case, the signals (multiplexing of 5 signals) would be to be equally delayed by 11/5. It is difficult for the digital circuit to provide an equal delay time. The signals would be delayed by multiples of an integer of the number of chips. The signals would be delayed by 2, 2, 2, 2 and 3 chips in this case.

Such delaying by multiples of the integer of the chip is readily applicable in embodying the invention which is disclosed in Japanese Patent Application No. 8-13963, the inventors and the applicant of which are identical to those of the present application.

The correlation output in such a case becomes an output in which respective outputs of five signals are multiplexed. A case in which the root of the sum of the squares of the outputs is calculated and the result is output will be considered.

The timing relationship of the correlation have to be 2, 2, 2, 2, 3 similarly to the transmitter side. In order to make difference among the timing signals on demodulation, it is necessary to establish a synchronization relationship with correlation in synchronization with a signal representing the leading edge of multiplexed block.

However, in the prior art synchronization circuit with correlated signals timing signals of the correlation are generated by the synchronization circuit with correlated signals and confirmation of the synchronization is conducted by comparing the signals exceeding the threshold with the timing signals.

An example of synchronization pulses which are generated by the synchronization circuit with correlated signals which operates in such a manner exemplified by the case using multiplexing of 5 signals.

In this case, coincidence of synchronization is determined when 3 pulses are consecutively generated in the initial synchronization. Accordingly, the relationship of FIG. 8A or FIG. 8B meets the requirement so that the signals may be synchronized in an erroneous timing relationship as is shown by this example.

Even if the number of the consecutive pulses is increased to 8, for example, in order to avoid this erroneous synchronization, coincidence may not occur at most twice and may occur 6 times. There is still the risk that erroneous synchronization may occur if two signals exceed the threshold due to noise.

Since coincidence occurs four times whereas incoincidence occurs twice, the number of the counts of the incoincidence is always lower than that of coincidence. If the number of the incoincidence is decreased to preset the number of overflows, the possibility of the erroneous synchronization may increase even if the signals are synchronized at appropriate positions.

This is due to the fact that the signal exceeds the threshold at least five times for a period of multiplexing.

The prior art synchronization circuit has problems that initial synchronization is unstable and that it is difficult for a synchronization holding circuit to properly function even if the signals are synchronized at incorrect positions.

SUMMARY OF THE INVENTION

The present invention was made in view of the above-mentioned problems in the prior art. It is an object of the present invention to provide a synchronization circuit with correlated signals which is capable of generating synchronizing signals for obtaining stable correlation signals if correlation processing is conducted by digital sampling in a direct spread spectrum telecommunication system or multiplexing is conducted and the spread factor is preset low.

(1) The invention resides in a synchronization circuit with correlated signals in the direct spread spectrum telecommunication system having a circuit for taking a given number of samples per one chip of spread signals which are directly spread in accordance with a spread code, to determine a correlation between the signals based upon the obtained sample value and the spread code and to generate a synchronization signal in response to the resultant correlated signal input thereto, said circuit for generating said synchronization signals comprises comparing and determining means for determining by comparing a predetermined threshold with said correlated signals; and median maximum discriminating means for outputting a flag representing where the median sample is larger in amplitude than the previous and subsequent samples along successive odd number of samples of said correlated signal, whereby a synchronization signal is generated based upon an output which is generated when said comparing means determines that said correlated signal exceeds the threshold and a flag which is set by said median maximum discriminating means.

(2) The invention resides in a synchronization circuit with correlated signals in the direct spread spectrum telecommunication system having circuit in which the correlation is determined between a spread code and the multiplexed signals which are obtained by delaying the spread signal which are directly spread as a block of desired number of chips in accordance with the spread code and by multiplexing plural series of signals having different delay intervals for outputting a synchronization signal in response to an obtained correlated signal input thereto, said circuit for generating said correlation synchronization signal comprises delay interval determining means for determining whether one of said input correlation signal has said different delay interval from others, whereby a correlation synchronizing signal is generated with reference to a flag which is set on determination by said delay interval determining means.

(3) The invention further resides, in the invention as mentioned (2) above that circuit which takes a given number of samples per one chip of spread signal used in correlation for determining the correlation based upon the obtained sample values and generates said synchronization signal by using the obtained correlated signal, comprises comparing and determining means for comparing a preset threshold with a value of said correlated signal and median maximum discriminating means for setting a flag when the median of the consecutive odd number of samples of said correlated signal is larger than the values of previous and subsequent samples, whereby an output issued when said comparing means determines that the correlation signal exceeds the threshold and a flag set by said median maximum discriminating means are input to said delay interval determining means.

(4) The invention further resides, in the invention as mentioned (2) or (3) above that said circuit for generating said synchronization signal conducts an initial synchronization in accordance with only a given data pattern portion of a predetermined data format if said spread signals are spread in accordance with a data which is determined by said data format.

(5) The invention further resides in that said circuit for determining a correlation between a spread code and spread signal which are directly spread in accordance with the spread code and for generating synchronization signals in response to obtained correlated signal includes circuit based upon correlated signal per se and circuit as mentioned in any one of (1) through (4) above and selects among said circuit in response to the number of the spread signals to be multiplexed.

(6) The invention further resides, in the invention as mentioned in any one of (2) through (5) above in that said circuit for generating said synchronization signals includes storing means for storing data representative of the number of the signals to be multiplexed, the delay intervals which are different for delay times and the timing relationship of the leading edge of the multiplexed block corresponding to a position at which said flag is set if said spread signals are spread in accordance with a data format which is capable of changing the number of signals to be multiplexed and the delay time and in that said circuit adjustably generates a signal representing the timing relationship with the leading edge of the multiplexing block in accordance with said data which is selected from said storing means in response to the data on the number of signals to be multiplexed and the delay time.

(7) The invention further resides, in the invention as mentioned in (6) above that said circuit for generating said synchronization signal generates a signal representative of the timing relationship with the leading edge of the multiplexed block by using a data representative of said different delay intervals or the timing relationships which are embedded in a simplex portion of said data format as a data.

(8) The invention further resides in that circuit which determines the correlation between a spread code and spread signal which are directly spread in accordance with the spread code includes storing means for storing data for presetting said synchronization signal generating circuit in response to the number of signals to be multiplexed, said circuit being adapted to select any of circuit based upon the correlated output per se, circuit as mentioned in (1) above, and circuit as mentioned in (2) through (4) above as circuit used in circuit which generates said synchronization signal depending upon said presetting data which is selected from said storing means depending upon the input data representative of the number of the signals to be multiplexed, and further including transmitting/receiving means for transmitting/receiving data content of said storing means, whereby operation is conducted by circuit which is preset depending upon the data from said transmitting/receiving means and said storing means.

BRIEF DESCRIPTION OF THE DRAWINGS

FIGS. 6A, 6B, 6C, 6D and 6E are charts for explaining wave form of the respective output signal with time of the correlation processing which is conducted by the prior art multiplexing system.

FIG. 6F is a chart for explaining wave form of the output signal with time after mixing the correlated signals which is conducted by the prior art multiplexing system.

PREFERRED EMBODIMENTS OF THE INVENTION

Prior to explaining preferred embodiments of the present invention, a prior art synchronization circuit with correlated signal in the direct spread spectrum telecommunication system will be described below as references for the present invention.

The present invention relates to a spread spectrum telecommunication and in particular to a synchronization circuit with correlated signal used in the spread spectrum telecommunication using a direct spreading method.

The spread spectrum telecommunication has been recently put into practice and has an advantage over general narrow-band telecommunication in that it has a high immunity from multi-path and/or non-white noise.

In a system for accomplishing such direct spread spectrum telecommunication, it is necessary to conduct a spreading and despreading operations in the modulation and demodulation stages, respectively.

Figure 1:
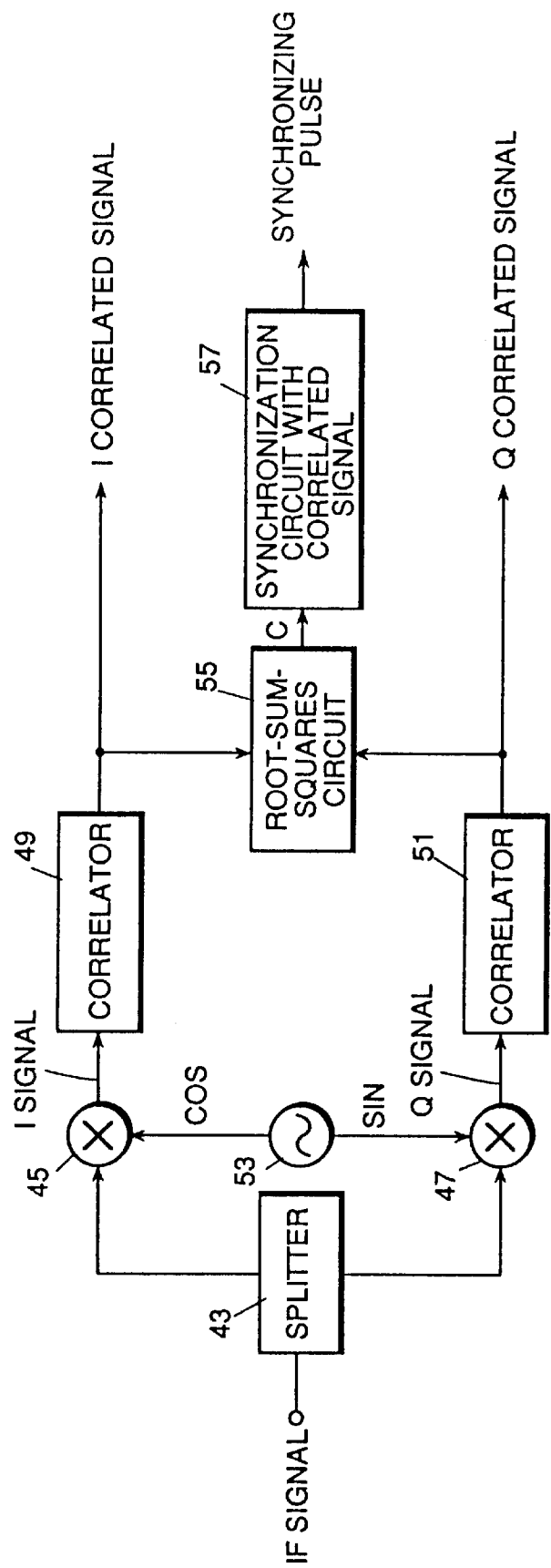
FIG. 1 is a block diagram showing an example of a circuit having a synchronization circuit which is used for a receiver in a prior art spread spectrum system.

An example of a receiver in such a system is illustrated in FIG. 1.

A received incoming signal is converted from a RF (radio frequency) signal to an IF (intermediate frequency) signal. Processing circuits for processing the signal after it has been converted into IF signal is illustrated in FIG. 1.

As shown in FIG. 1, the IF signal is split by means of a splitter 43 into two signals, which are then multiplied with a cosine and sine components of a local signal from a local oscillator 53 by means of multipliers 45 and 47, respectively. Signals from the multipliers 45 and 47 are input to two correlators 49 and 51 as an I and Q signals of respective base band components, respectively. These correlators 49 and 51 have codes which are preset to correlate with spread codes which have been spread by a transmitter. A correlation relationship between the present codes with the spread codes is established in the correlators 49 and 51 so that I and Q correlated signals are output therefrom, respectively.

Thereafter, they are demodulated in demodulating units. At this end, it is necessary to input the I and Q correlated signals to the demodulating unit in synchronization of the correlated signals. The circuit for this synchronization is referred to as synchronizing unit with correlated signals.

In order to establish a synchronization relationship, a root of the sum of the squares of the outputs from I and Q correlators 49 and 51 is determined by a root-of-sum-of-squares circuit 55 to provide an output of the absolute value of the correlated signals.

Figure 2A:
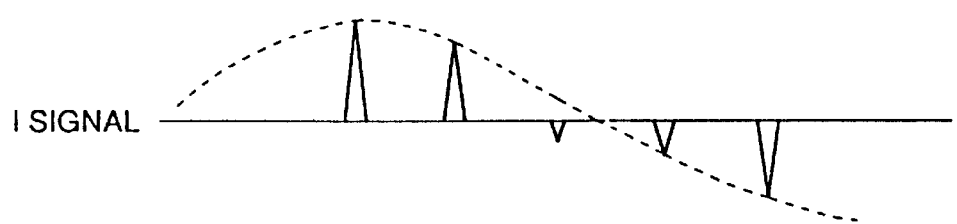
FIGS. 2A, 2B and 2C show, respectively the wave form of the output signal with time for correlation processing in the circuit of FIG. 1.
Figure 2B:
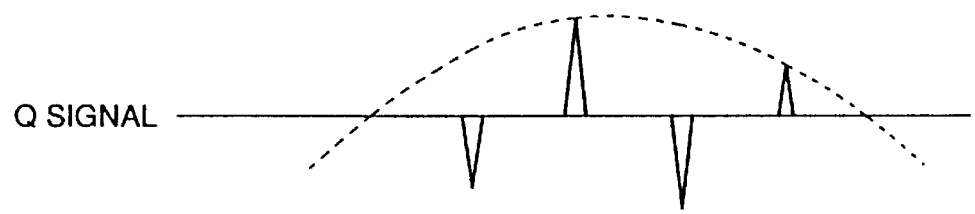
Figure 2C:
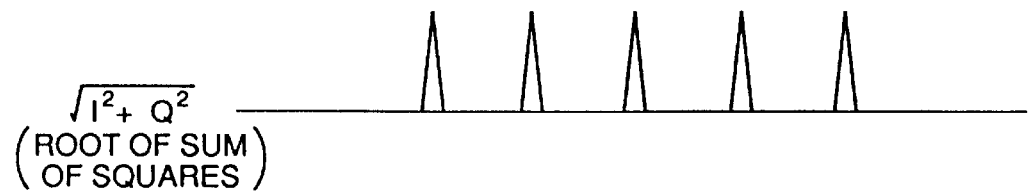

Outputs from respective units which are associated with this correlation processing are illustrated in FIGS. 2A, 2B and 2C.

The correlated signals represent signals in the form of spike, which are generated in a timing of high correlated relationship. These signals are referred to as correlation spikes. The correlation outputs of the I and Q signals per se assume values which are on curves represented by positive and negative sine and cosine functions. The root of the sum of the squares, that is $\sqrt{I^2+Q^2}$ assumes a constant value at its peak. This is due to the fact that there is a relation $\sin^2\theta + \cos^2\theta = $ constant.

Accordingly, the synchronization circuit with correlated signals 57 synchronizes with a desired signal by using a signal representing the root of the sum of the squares which is denoted in FIG. 2C to provide synchronizing pulses.

A synchronization circuit with correlated signals which is similar to the frame synchronizing system of the general digital wireless telecommunication system is used as the synchronization circuit with correlated signals of the above-mentioned direct spread telecommunication system.

The synchronization circuit used for the general frame synchronization circuit is disclosed in, for example, 田中公男(Kiaio Tanaka) "デジタル通信技術(Digital Telecommunication Technology)", published by 東海大学出版会(Tokai University Publishing Association).

Figure 3:
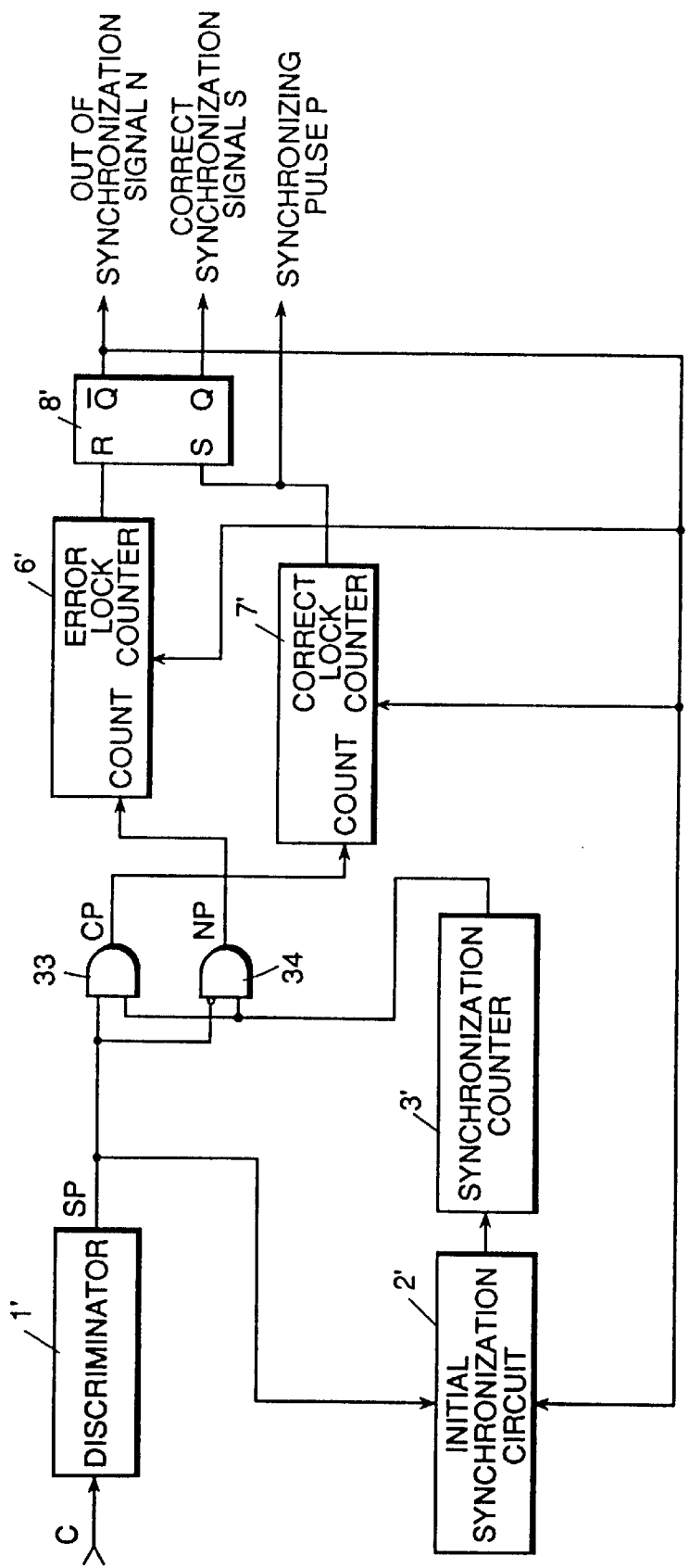
FIG. 3 is a circuit block diagram showing a synchronization circuit with correlated signal in a receiver of the prior art spread spectrum system.

FIG. 3 is a schematic block diagram showing a synchronization circuit with correlated signals in a receiver of the prior art spread spectrum telecommunication system, which is similar to the synchronization circuit for the general frame synchronization, which is exemplified above.

In FIG. 3, the prior art synchronization circuit with correlated signals comprises a discriminator 1', initial synchronization circuit 2', synchronization counter 3', AND circuits 33, 34, flip-flop 8' error lock counter 6', correct lock counter 7' and so on.

In this synchronization circuit with correlated signals the discriminator 1' compares the correlated signal C which is obtained as the root of the sum of the squares with a predetermined threshold. If the correlation signal C exceeds the threshold, the discriminator 1' determines that the correlation is so high that the signals are synchronized for generating synchronizing pulses (correlated signal detection pulses) SP.

The initial synchronization circuit 21 confirms that several detection pulses have been consecutively generated at positions of the correlation spikes (each period of code) and enables the synchronization counter 3' to operate after determining that the initial synchronization is achieved.

This causes the synchronization counter 3' to individually count the synchronization of the next correlation spikes.

An AND logical operation between the output of the synchronization counter 3' and the correlation pulse SP from the discriminator 1' is conducted by an AND circuit 33.

If the signals are synchronized with each other at appropriate positions, signals would be generated from the synchronization counter 3' in a timed relationship in which next correlation spike would be generated when considering the initial synchronization timed relationship. On the other hand, the correlation detection pulses SP are generated at positions of correlation spikes. Agreement between two signals is determined by the AND circuit 34. When they agree, the circuit 33 generates a count pulse CP for counting up the correct lock counter 7'.

Since the two signals do not agree when the initial synchronization is erroneous, the circuit 33 counts up the error lock counter 6'. If the initial synchronization is appropriately conducted in such a manner, a correct synchronization with correlation would be kept. If it is improperly conducted, the error lock counter 6' would exceed a preset value to determine that it is in an erroneous synchronization relationship for resuming the initial synchronization relationship.

As mentioned above, in the prior art, a determination was made based upon a threshold whether correlation outputs are correlated to each other and it is determined that there is a correlation therebetween if the correlation output exceeds the threshold.

The difference of the outputs between the case in which a correlation is established and the case in which no correlation is established is large when the spread factor is high. Recently, spread code having a spread factor which is in order of about 10 may be used. In this case, the output difference between the above-mentioned cases would be small.

Even if the number of samples is increased in view of a low spread factor, the increase in scale of the circuits such as correlator and the like is less. Accordingly, the number of samples may be increased from two samples per one chip to three or four samples per one chip.

This example will be described with reference to FIG. 15.

Figure 4:
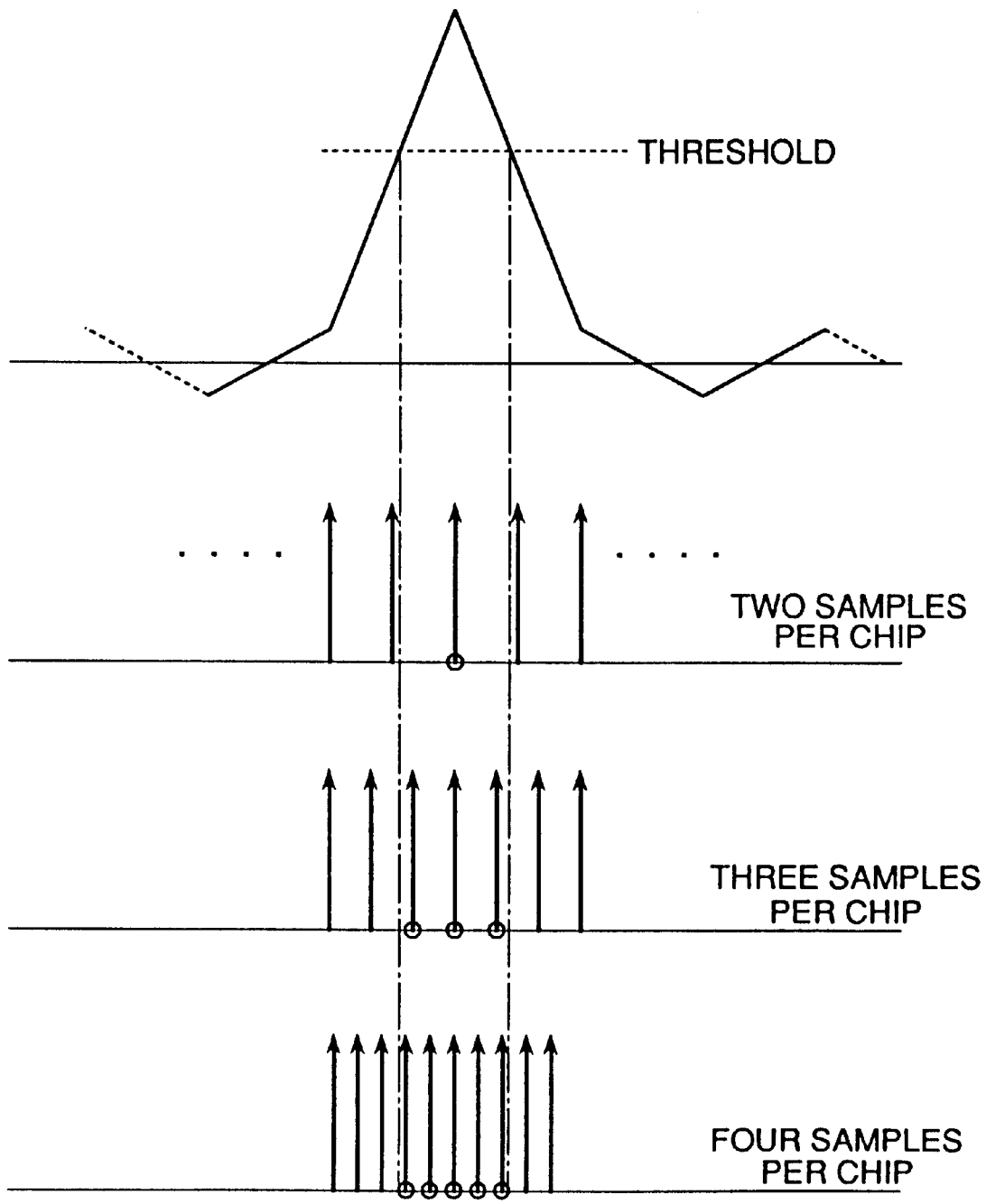
FIG. 4 shows the sampling of the correlation output when the number of samples per one chip is changed.

In FIG. 4, the sample points in a period of time when the correlation value along a correlation output curve in the upper part of the drawing exceeds the threshold are designated by circle marks. Three samples and five samples exceed the threshold for during one correlation spike due to the fact that the spread factor is low and the number of samples is increased as shown in cases of three samples per one chip and five samples per one chip. The prior art circuit has a drawback that the sample which previously exceeds the threshold would be synchronized so that a sample which does not correspond to higher correlation spike is synchronized.

A multiplexing system in the spread spectrum communication is disclosed in Japanese Patent Application No. 7-206159, the inventors and applicant of which are identical to those of the present application, respectively.

The configuration of a transmitter system in the multiplexing system will now be described with reference to FIGS. 5A and 5B.

A data signal is differentially coded by a differential coding unit 22 and then converted into four parallel signals P1 to P4 by a serial/parallel converter 23. Data generator 21 is also provided.

The parallel signals P1 to P4 are multiplied by spread codes from a PN generator by multipliers 24-1 through 24-4 to provide independent spread signals M1 to M4, respectively. After the signals M1 to M4 are differently delayed by delay elements 26-1 to 26-4, respectively, they are mixed by a mixer 27 and then the mixed signal is modulated by a multi-value modulator 28 having an local oscillator 29 and is frequency-converted by a frequency-converter 30 and is transmitted to air after being amplified by a power amplifier 31. This causes a number of signals which are serial/parallel converted to be multiplexed for transmission. Although the signal is converted into four parallel signals in FIG. 5, the number of the signals may be optionally preset when the number of signals to be multiplexed is preset.

A case in which the thus transmitted signal is received and is passed through the correlator as shown in FIG. 1 will be considered.

Since the multiplexed signals are the sum of individual independent signals, the output from the correlator is the linear sum of the outputs which are obtained when respective signals are passed through the correlator.

This example is shown in FIGS. 6A through 6F.

Figures 5, 5A:
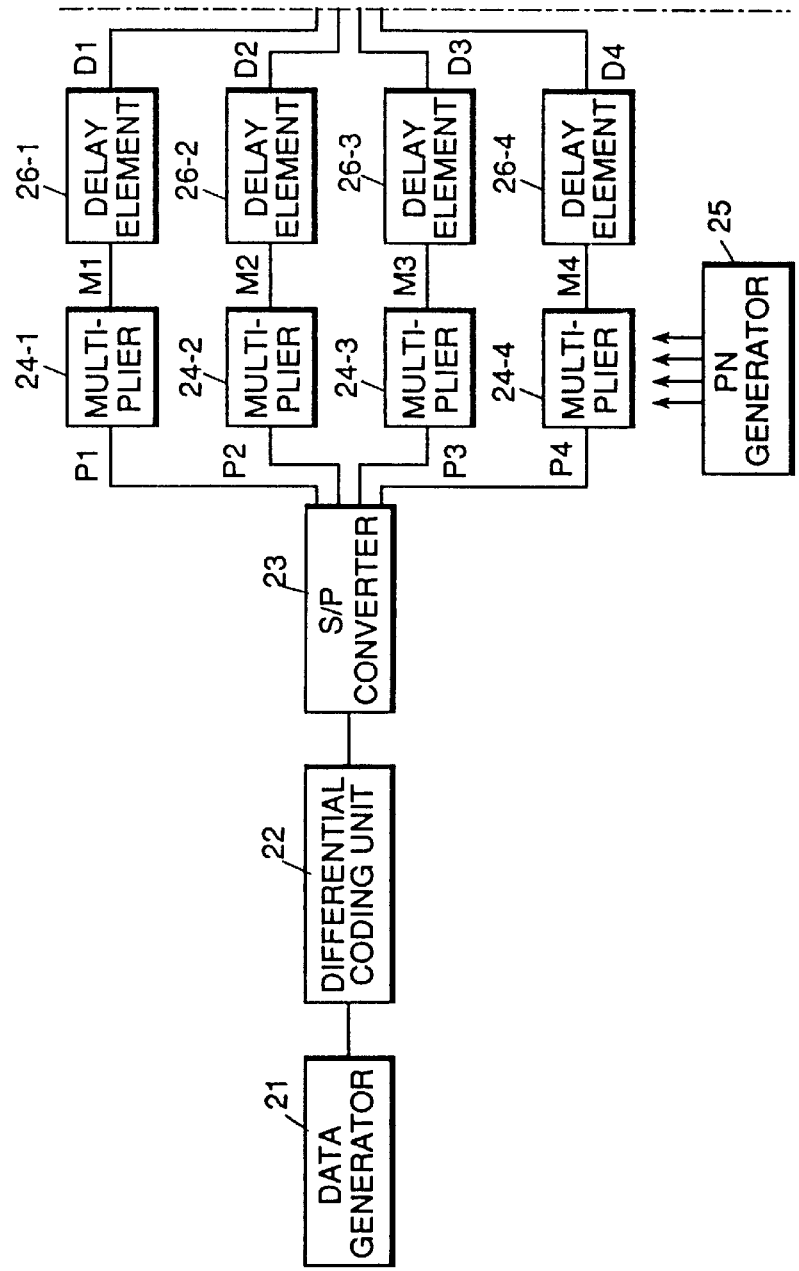
FIG. 5 shows the correct alignment of the drawing sheets for FIGS. 5A and 5B.
FIGS. 5A and 5B are a circuit block diagram showing the configuration of a transmitter system in the prior art multiplexing system.
Figure 5B:
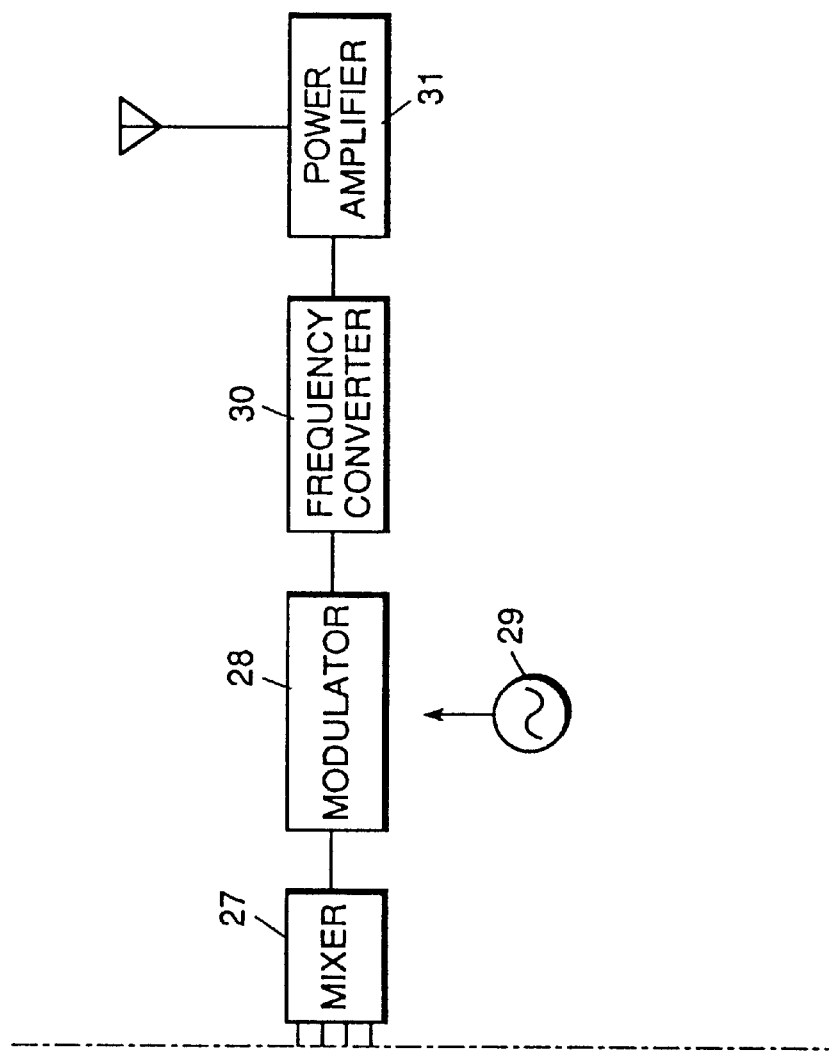

This example is a case of multiplexing of 5 signals unlike that of 4 signals in FIG. 5. The Barker code of 11 chips is used as a spread code.

In this case, the correlation value largely varies in a range of 7 to 15 (absolute value).

Accordingly, it is necessary to decrease the threshold so that the correlation value exceeds the threshold even when it is 7. By do so, the correlation value exceeds the threshold over several samples when it assumes 15. There is the higher risk that erroneous synchronization may occur than the previous case.

Another problem which may occur in the prior art will also be described.

It is assumed that a correlation flag be set at the position where the correlation is highest.

In this case, the signals (multiplexing of 5 signals) would be to be equally delayed by 11/5. It is difficult for the digital circuit to provide an equal delay time. The signals would be delayed by multiples of an integer of the number of chips. The signals would be delayed by 2, 2, 2, 2 and 3 chips in this case.

Such delaying by multiples of the integer of the chip is readily applicable in embodying the invention which is disclosed in Japanese Patent Application No. 8-13963, the inventors and the applicant of which are identical to those of the present application.

The correlation output in such a case becomes an output as shown in FIG. 6F in which respective outputs FIGS. 6A to 6E of five signals are multiplexed. A case in which the root of the sum of the squares of the outputs (FIG. 6F) is calculated and the result is output will be considered.

Figure 7A:
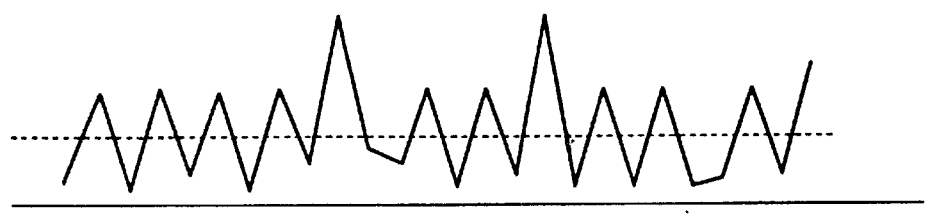
FIG. 7A shows the wave form of the output signal of the correlation processing which is conducted by the prior art multiplexing system.
Figure 7B:
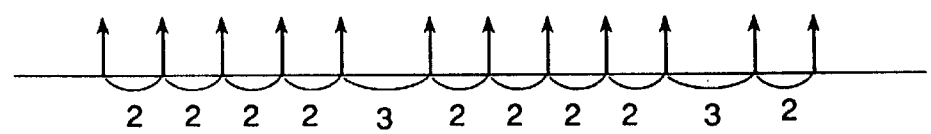
FIGS. 7B and 7C are charts for explaining the synchronization detecting timing relating to chart in FIG. 7A.

FIGS. 7A and 7B show an example of its output and the timing relationship of the correlation, respectively.

Figure 7C:

The timing relationship of the correlation have to be 2, 2, 2, 2, 3 similarly to the transmitter side as shown in FIG. 7B. In order to make difference among the timing signals on demodulation, it is necessary to establish a synchronization relationship with correlation in synchronization with a signal representing the leading edge of multiplexed block as shown in FIG. 7C.

However, in the prior art synchronization circuit with correlated signals timing signals of the correlation are generated by the synchronization circuit with correlated signals and confirmation of the synchronization is conducted by comparing the signals exceeding the threshold with the timing signals.

Figure 8A:
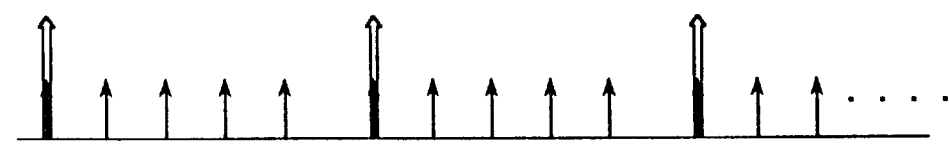
FIGS. 8A and 8B are charts for explaining, respectively, synchronization detection timing which is established by the prior art synchronization circuit with correlated signal.
Figure 8B:
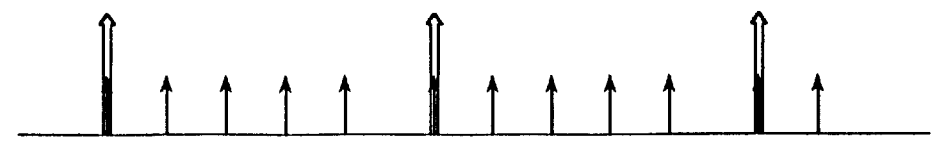

An example of synchronization pulses which are generated by the synchronization circuit with correlated signals which operates in such a manner is shown in FIGS. 8A and 8B. The illustrated case is multiplexing of 5 signals.

FIGS. 8A and 8B show that correct and error correlation synchronizing pulses are generated in the timing relationships, respectively.

In this case, coincidence of synchronization is determined when 3 pulses are consecutively generated in the initial synchronization. Accordingly, the relationship of FIG. 8A or FIG. 8B meets the requirement so that the signals may be synchronized in an erroneous timing relationship as is shown by this example.

Even if the number of the consecutive pulses is increased to 8, for example, in order to avoid this erroneous synchronization, coincidence may not occur at most twice and may occur 6 times. There is still the risk that erroneous synchronization may occur if two signals exceed the threshold due to noise.

Since coincidence occurs four times whereas incoincidence occurs twice, the number of the counts of the incoincidence is always lower than that of coincidence. If the number of the incoincidence is decreased to preset the number of overflows, the possibility of the erroneous synchronization may increase even if the signals are synchronized at appropriate positions.

This is due to the fact that the signal exceeds the threshold at least five times for a period of multiplexing.

The prior art synchronization circuit has problems that initial synchronization is unstable and that it is difficult for a synchronization holding circuit to properly function even if the signals are synchronized at incorrect positions.

A first embodiment of a synchronization circuit with correlated signals of the present invention will be described with reference to FIGS. 9, 10 and 11.

Figure 9:
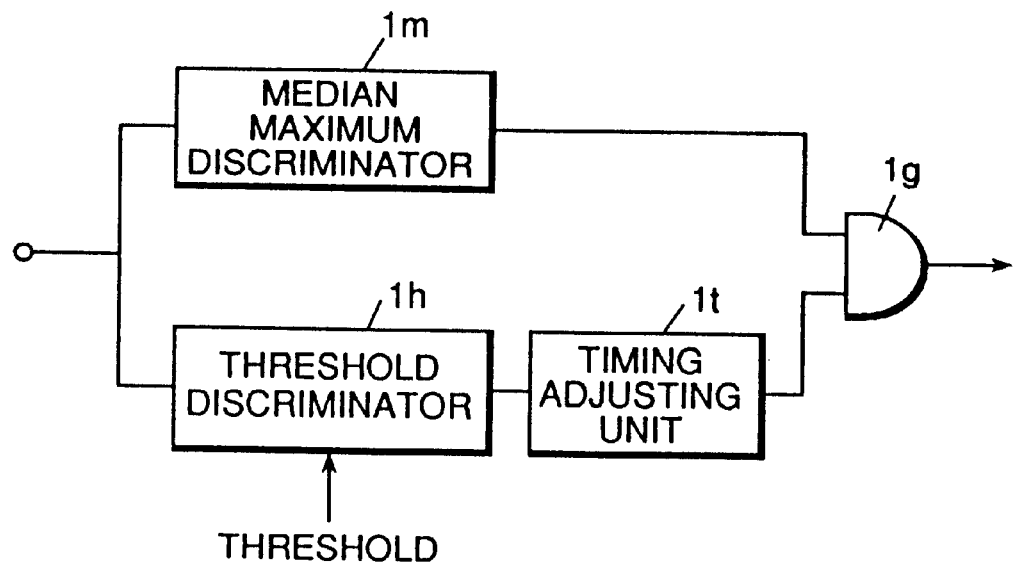
FIG. 9 is a circuit block diagram showing a determining unit in the synchronization circuit with correlated signal of the present invention.

FIG. 9 is a block diagram showing the configuration of the circuit which is relevant to the discriminator 1' (refer to FIG. 3) in the above-mentioned prior art.

As is similar to the prior art, a correlation signal ($\sqrt{I^2+Q^2}$) which is generated by calculating the root of the sum of the squares of inputs to the circuit. The signal is then split to pass through two paths. One of the signals is input to the threshold discriminator $1h$ which compares the input signal with a given threshold and outputs a signal representative of a result of the comparison when the correlation output signal to be processed exceeds the threshold.

Another signal is input to the median maximum discriminator $1m$, which sets a flag as its output when the median of the odd number of samples is higher.

Figure 10:
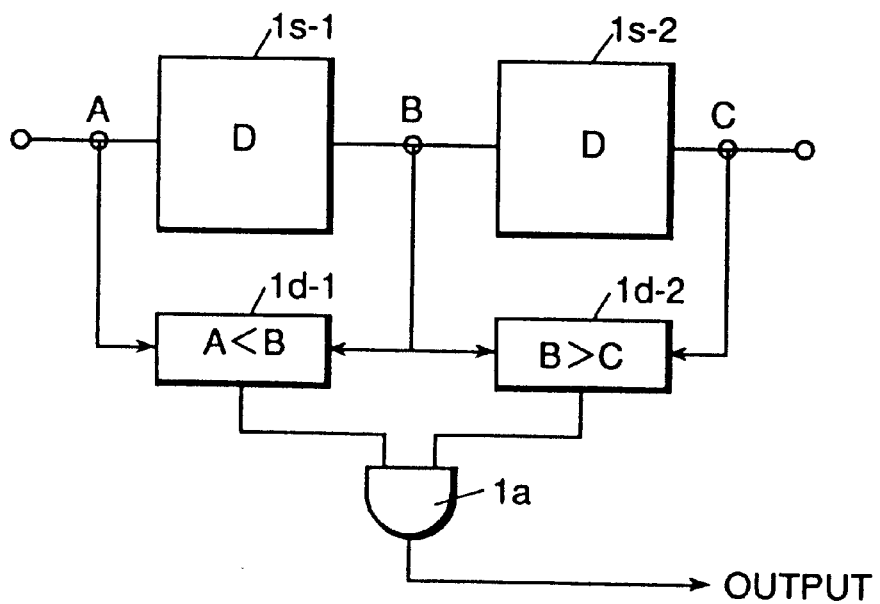
FIG. 10 is a block diagram showing the more detailed circuit configuration of a median maximum discriminator in FIG. 9.

FIG. 10 is a block diagram showing the configuration of the median maximum discriminator $1m$ which is embodied in more detail.

In FIG. 10, outputs which correspond to the odd number of samples can be obtained from the input signals by delay means comprising shift registers $1s$-1, $1s$-2 and so on. Herein three samples A, B and C are shown. An output signal is obtained in synchronization with the timing signals for A, B and C when (A<B) and (B>C). At this end, there are provided a (A<B) logical determining circuit $1d$-1, (B>C) determining circuit $1d$-2, and AND circuit $1a$ which operates an AND operation between the outputs from both the determining circuits $1d$-i and $1d$-2. The median maximum discriminator $1m$ provides an output from the AND circuit $1a$.

Since a delay element such as shift registers are used in this circuit, the output signal is not synchronized with the other signal representing that the threshold is exceeded. Accordingly, the timing relationship is adjusted by a timing relation adjusting unit $1t$. Establishment of the correlation is represented when both conditions are satisfied.

A synchronization relationship is established in response to this output signal by using a synchronization circuit with correlated signals which is similar to that in the prior art.

Figure 11:
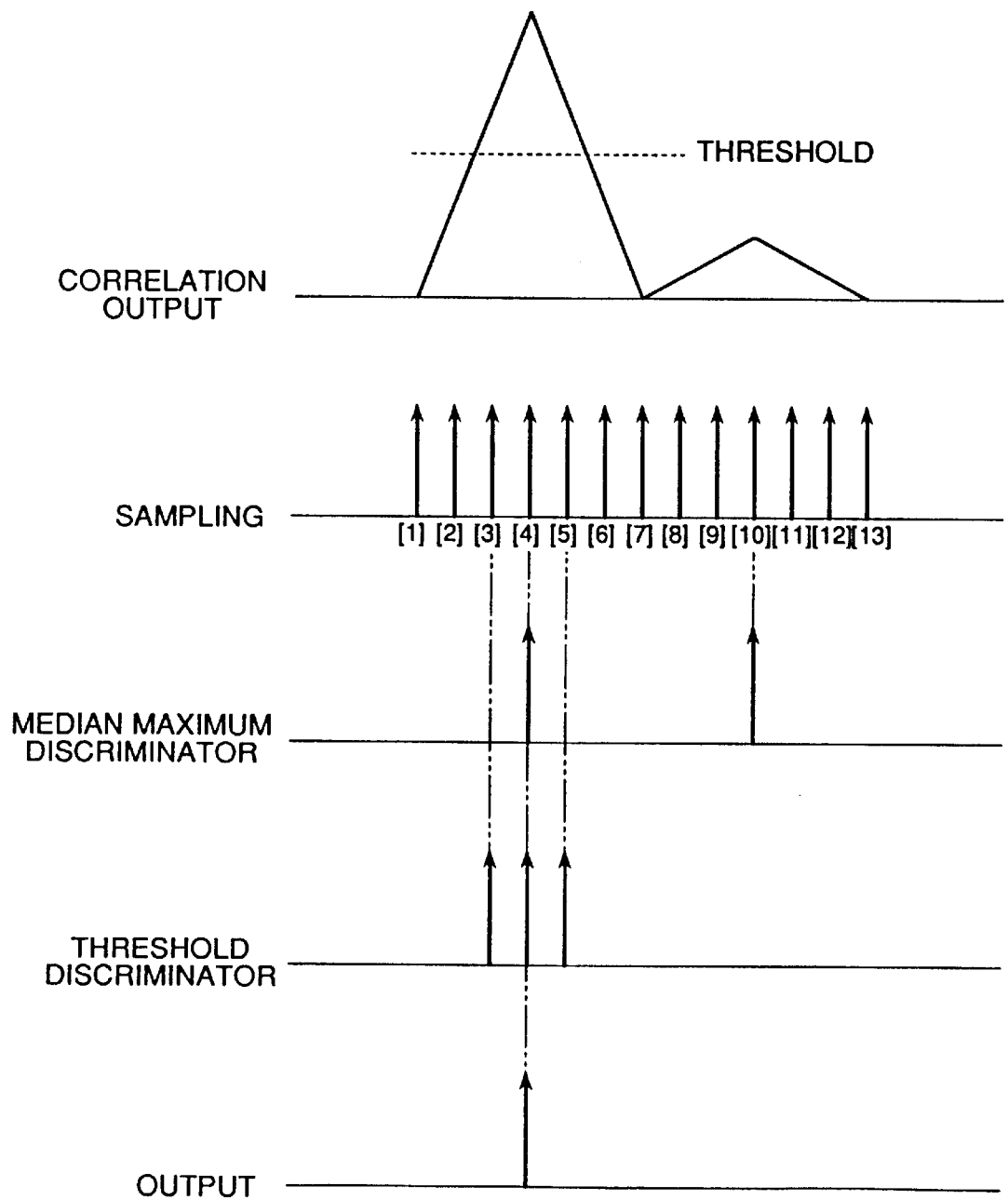
FIG. 11 is timing charts for explaining synchronization detecting timing based upon the median maximum discrimination and threshold discrimination in accordance with the present invention.

FIG. 11 is charts showing the conditions of correlation signals for illustrating how processing is conducted in this embodiment.

In the example of FIG. 11, sampling [1] to [13] is conducted so that samples are processed by each chip including three samples. A dotted line intersecting with the wave-form representing the correlation output denotes a threshold. The output of the median maximum discriminator $1m$ is flagged at two positions [4] and [10].

The output of the threshold discriminator $1m$ is flagged at three positions [3], [4] and [5] in which the threshold is exceeded.

Since an AND operation between the flagged outputs from the median maximum and threshold discriminator is conducted to provide an output from the entire of the circuit, an output which is maximum at the midpoint and exceeds the threshold is correspondingly flagged at position [4].

Although an erroneous synchronization relationship is established at the position [3] which is a leading flagged output from the threshold discriminator by an fault in the prior art, a correct synchronization can be established at position [4] in accordance with the present invention.

In other words, while synchronization has been established wherever the threshold is exceeded in the prior art, the present invention makes it possible to always establish a correct synchronization relationship at the position in which the correlation value is maximum.

As a result, demodulation can be conducted at position [4] rather than [31] if demodulation is conducted by using the correlation output, so that a high signal-to-noise ratio is provided. Reduction in error rate can be achieved.

In the embodiment (FIG. 9), a parallel configuration in which a signal is divided and input to different discriminators is illustrated. The present invention may be embodied in a serial configuration in which two discriminators are in series connected to each other.

The effects are same even if processing is firstly conducted in either of the discriminators.

The invention is described with reference to three samples. Five samples A, B, C, D and E may be used by conducting a logical operation (A<B<C) and (C>D>E).

Now, a second embodiment of the present invention is described.

The present embodiment aims at overcoming a problem that the correlation timing signals are synchronized in an erroneous manner in case that transmitting and received signals are multiplexed.

Figure 12:
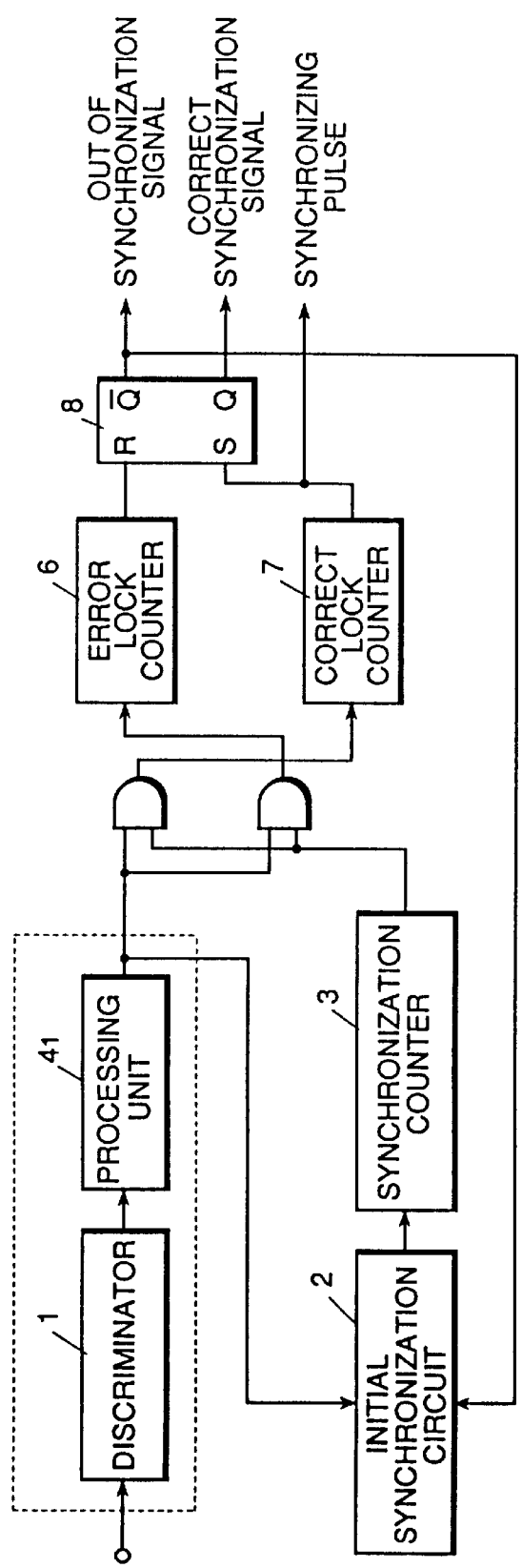
FIG. 12 is a circuit block diagram showing one embodiment of a synchronization circuit with correlated signal of the present invention.

FIG. 12 is a block diagram showing an embodiment of the configuration of a correlation synchronization circuit which processes multiplexed signals in accordance with the present invention. A signal which is inputted from a correlator is input to a discriminator 1 which is similar to that of the first embodiment of the present invention and thereafter is input to a processing unit $4_1$. The discriminator 1 and the processing unit $4_1$, which are enclosed by a dotted line are components which feature the present embodiment. The present embodiment is identical with the prior art (refer to FIG. 3) excepting these features.

Figure 13:
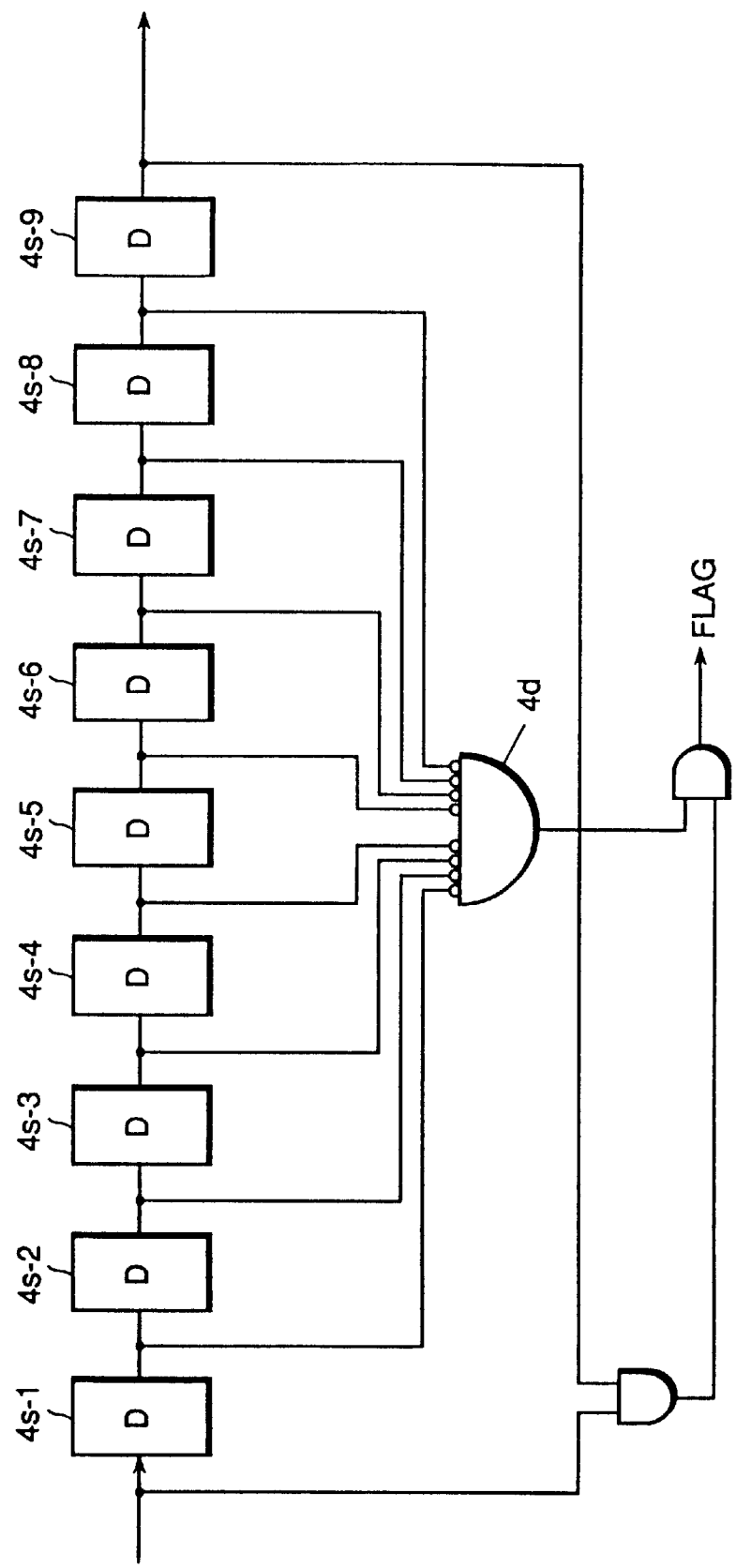
FIG. 13 is a circuit block diagram showing more detailed circuit configuration of a processing unit in FIG. 12.

FIG. 13 is a diagram showing an example which is more specific than the processing unit $4_1$ in FIG. 12. In FIG. 13, references 4s-1 through 4s-9 denote shift registers, 4d an AND circuit for the reversed input signal from each of the shift registers.

Operation of the processing unit $4_1$ will now be described with reference to FIG. 13.

If five signals are multiplexed, the correlation spikes are generated as a repetition of 2, 2, 2, 2 and 3 chips in a timing relationship as shown in FIG. 7B.

Figure 14A:
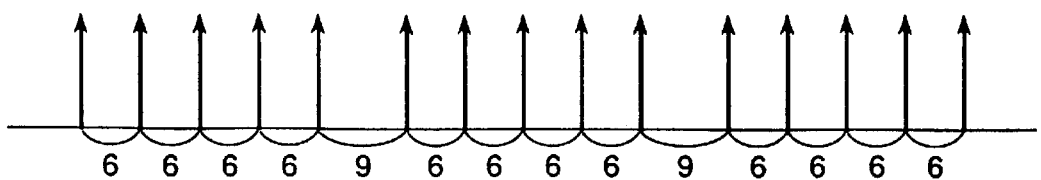
FIGS. 14A and 14B are charts for explaining, respectively, the synchronization detecting timing in a circuit of the present invention shown in FIG. 13.

If the signals are received on one chip three sample basis on the side of receiver, the correlation spikes are generated as a repetition of 6, 6, 6, 6 and 9 samples in a timing relationship as shown at the upper portion of FIG. 14A.

Figure 14B:

If such signals are inputted to a circuit of FIG. 13, the circuit is arranged not to provide an output signal when the correlation spikes are spaced by 6 samples and to provide a flagged output only when the spikes are spaced by 9 samples, that is, at a position separated by three chips, as shown in FIG. 14B.

This outputs is used to generate synchronizing pulses to establish a correlation relationship in FIG. 12.

The conversion approach has a problem that the out-of-synchronization relationship cannot be caused when the signals are multiplexed even if the signals are synchronized in an erroneous timing relation. This is due to the fact that several correlation flags are set in a period of multiplexing.

However, in accordance with the present invention, one flag is generated only when the interval in which the correlation spikes are generated is different from the other interval (in this case, three chips, 9 samples). Accordingly, only one output is generated from the processing unit in one period. As a result of this, erroneous detection of correlation signal is eliminated since only one signal is selected in one period unlike the prior art in which one signal is selected from 5 signals in the prior art.

In such a manner, prior art problem is overcome due to the fact that one reference can be established in one period in accordance with the present invention.

An example is illustrated in which five signals are multiplexed and the interval of the multiplexing is made 3 chips in one region in one period and three signals are sampled in one chip interval. This scheme is equally applicable irrespective of the number of the signals to be multiplexed if the multiplexing (delay) interval is different at only one position. In other words, with reference to a system of multiplexing of three signals, only the positions of the 3 chips which are different from the other chips are required to be identified if the delay intervals are 4, 4 and 3 chips.

Although the present invention has been described with reference to the discriminator 1 which is the first embodiment, the present invention is capable of accomplishing synchronization with correlated signals by processing the intervals among the correlation spikes output from the discriminator if the discriminator using only a threshold as mentioned as a prior art is used.

A third embodiment of the present invention will be described with reference to FIG. 15.

Figure 15:
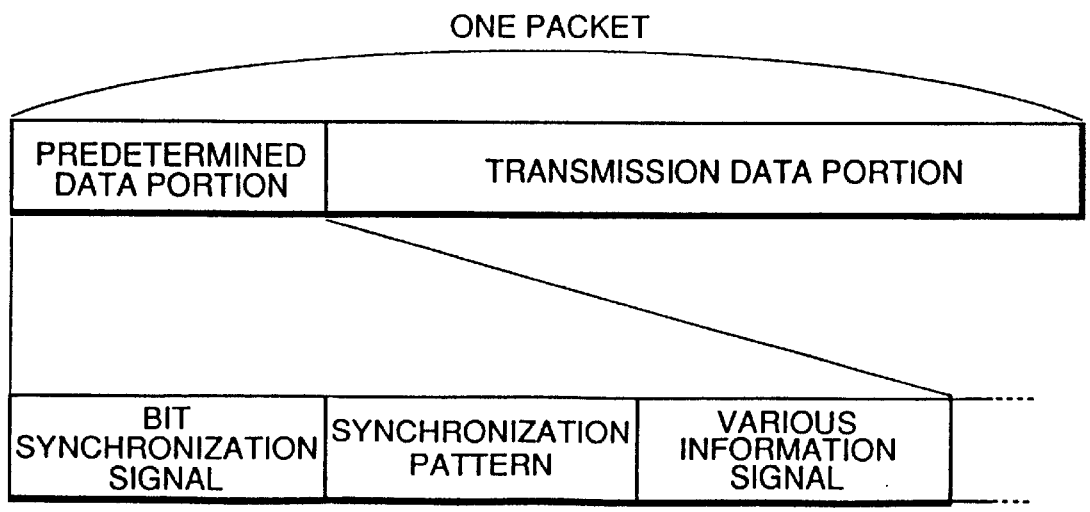
FIG. 15 shows an example of a data format used in the present invention.

A data format which is exemplarily shown in FIG. 15 is generally used for telecommunication.

The data format comprises a predetermined leading data portion, which is followed by a transmission data portion to be transmitted. The predetermined leading data portion includes a bit synchronization signal portion, synchronization pattern signal portion and various items of information.

The present embodiment has a feature that the circuit of the present invention can be operated by only the predetermined data portion, particularly by bit synchronization signal.

In case of the data configuration as shown in FIG. 15, the timing relationship of the data is calculated from the synchronization pattern and demodulation is conducted based upon the bit position in the synchronization pattern. Accordingly, if detection of the synchronization pattern is failed, the transmission data portion could not be demodulated. Therefore, if a synchronization relationship with correlation cannot be established in response to the bit synchronization signal, or alternatively, a synchronization relationship is established once and it is lost again after the synchronization pattern and it is established again, no data in this packet could be used.

Accordingly, in the present embodiment, the synchronization circuit with correlated signal is operated in response to only the bit synchronization signal and the circuit is effectively disabled after the synchronization pattern. As a result of this, the synchronization circuit with correlated signal operates for only a very short period of time of the receiving period. Thus, substantial saving in consumed energy could be achieved.

There is an advantage that a synchronization relationship with correlation can be readily established since the bit synchronization signal generally includes repeating data such as 1, 0, 1, 0 and so on.

A fourth embodiment of the present invention will be described.

Japanese Patent Application No. 8-47118 discloses a multiplexing system for spread spectrum telecommunication comprising non-multiplexed and multiplexed portions. This system is used to provide a compatibility with the other systems.

In a wireless communication path, multiplexing deteriorates the propagation characteristics with the increase in the number of signals to be multiplexed. Higher and lower number of multiplexed signals is used for better and worse electromagnetic environments, respectively.

However, initial presetting of the fixed number of multiplexed signals can not flexibly cope with the changes in electromagnetic environments. Accordingly, a simplex portion is commonly included in the signal and a data representative of the number of signals to be multiplexed is embedded therein. The number of signals to be multiplexed is changed depending upon the data.

This enables the number of multiplexed signals to be flexibly changed to provide an increased throughput of the data.

Considering that the synchronization circuit with correlated signal is used in such a system, a synchronization relationship is established in the multiplexed portion by using the synchronization circuit of the present invention while it cannot be done in the non-multiplexed portion since the intervals between the correlation spikes are different.

Thus, the discriminator for processing using a threshold which is shown as a prior art or a first embodiment of the present invention is used for the non-multiplexed portion and the above-mentioned second embodiment is used for the multiplexed portion.

This embodiment will be described with reference to FIG. 16.

Figure 16:
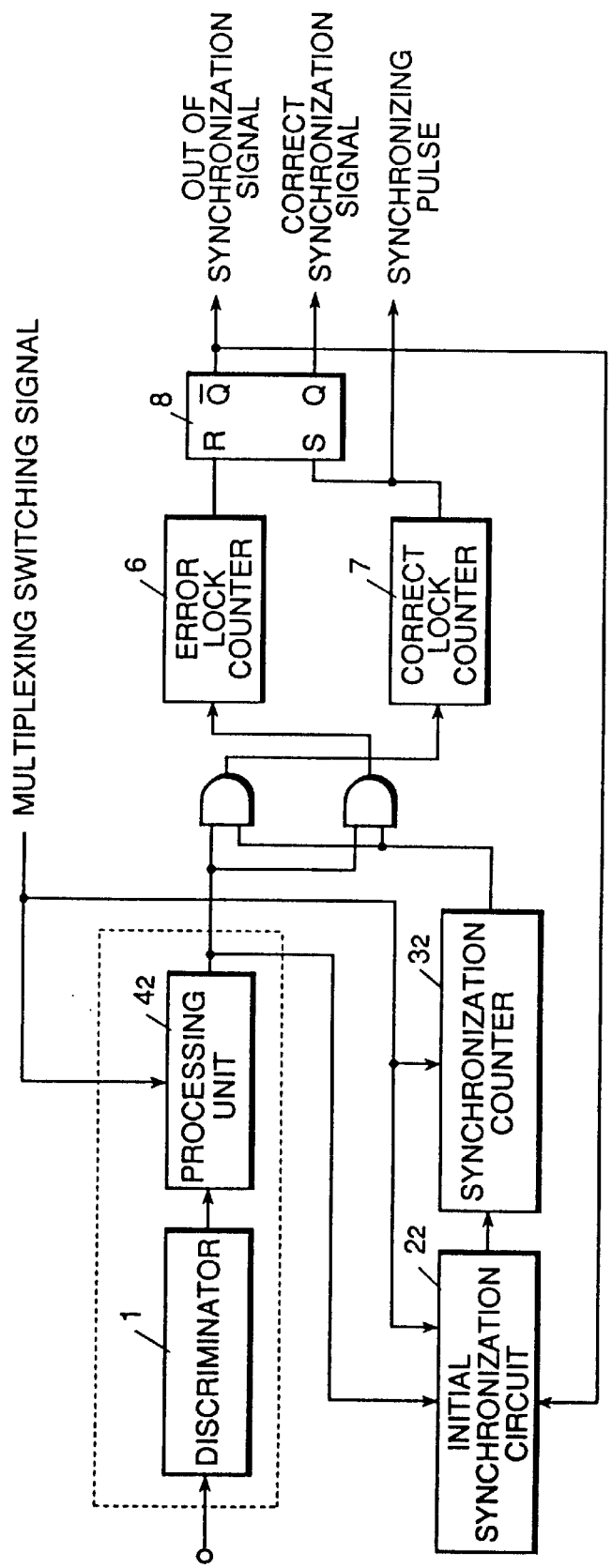
FIG. 16 is a circuit block diagram showing another embodiment of a synchronization circuit with correlated signal of the present invention.

In FIG. 16, a processing unit $4_2$, initial synchronization circuit $2_2$ synchronization counter $3_2$ are modified for accommodating the signal to be multiplexed portion. A signal for changing the number of multiplexed signals is input thereto.

Figure 17:
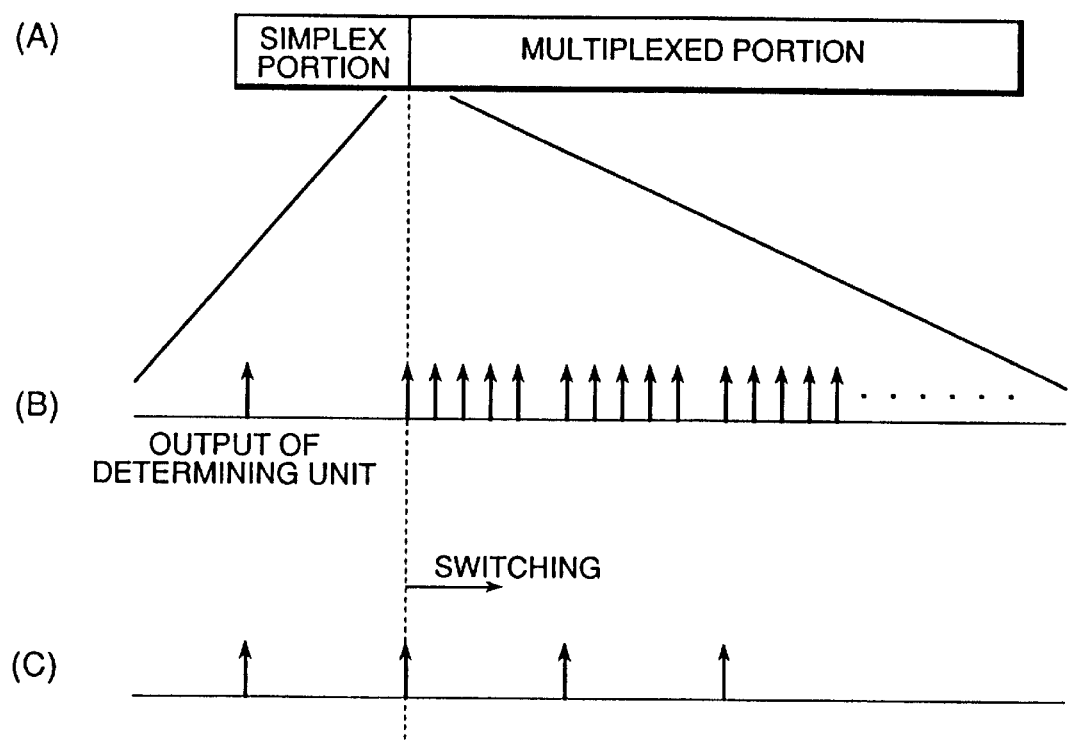
FIG. 17 shows the correlation outputs and detecting timing relationship when the system includes a non-multiplexed portion and multiplexed portion.

A format of transmission data including a simplex portion and a multiplexed portion is shown (A) in FIG. 17. Data correlation spikes which are obtained from a transmission signal having the above-mentioned format is shown (B) in FIG. 17.

Only one correlation output is obtained in the simplex portion for one period of the code while five correlation outputs are obtained in the multiplexed portion for one period of the code as shown (B) in FIG. 17.

If the above-mentioned discriminator for processing by using a threshold or the circuit in the first embodiment of the present invention is used for the simplex portion and the circuit in the second embodiment is used for the multiplexed portion, only one signal is output in each of the simplex portion and multiplexed portion for one period of the code.

As a result, stable outputs can be obtained in both non-multiplexed and multiplexed portions.

Switching of the number of signals to be multiplexed is carried out in response to a signal for switching the number of signals to be multiplexed.

If the length of the data of the simplex portion has been preset, the switching means could readily determine how the switching signal is supplied.

For example, a synchronization pattern exists in the predetermined data portion in a data format shown in FIG. 15. Accordingly, switching can be carried out by determining the length of the simplex portion with reference to the portion in which the synchronization pattern exists.

Figure 18:
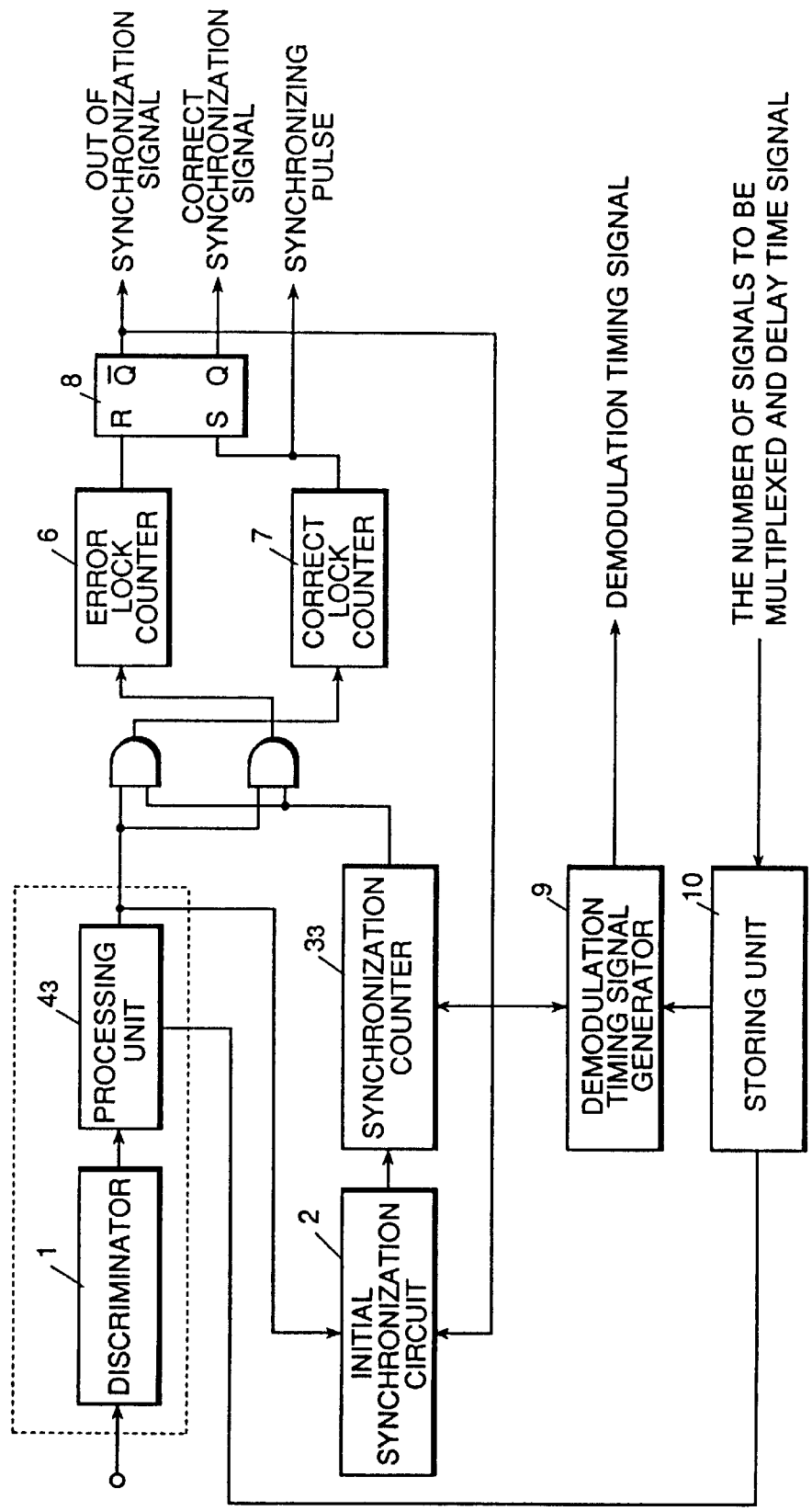
FIG. 18 is a circuit block diagram showing a further embodiment of the synchronization circuit with correlated signal of the present invention.

A circuit is configured as shown in FIG. 18 in case in which the data format has not been predetermined as mentioned-above and is changed each time of communication. A demodulation timing signal generator 9 and storing unit 10 are added as components.

In this case, presetting of the processing unit $4_3$ and generation of the timing signal is conducted depending upon the timing relationship of switching with the data representative of the number of signals to be multiplexed which is embedded in the simplex portion and the interval of the delay times used for synchronization.

In multiplexing five signals in 11 chips, which is exemplarily shown, the periods of delay are 2, 2, 2, 2 and 3. In multiplexing three signals, they are 4, 4 and 3. In multiplexing 2 signals they are 6 and 5.

However, in multiplexing of three signals, the delay periods may be 4, 3 and 4. In this case, a signal is flagged at a position of three chip interval.

Therefore, the timing relationships of the flags which are generated for one period of the code are different.

Since the timing relationships of the flags are different from that of the simplex portion, adjustment of the demodulation timing signal generator 9 is necessary.

In the present invention, a storing unit 10 is required as means for recording the demodulation timing relationship depending upon the number of signals to be multiplexed and the delay time.

The storing unit 10 is adapted to store data on the delay time of the processing unit and how the demodulation timing relation is shifted from the stored flag timing relation based upon externally given signals of the number of signals to be multiplexed and delay time.

The demodulation timing signal generator 9 receives the data to generate a demodulation timing signal so that one period of the code constantly starts at an appropriate position.

The synchronization circuit with correlated signal in which the out of demodulation timing relationship can be prevented even if the number of signals to be multiplexed is changed can be provided by doing in such a manner.

The processing unit $4_3$ is provided with a shift register which provides delay time for each number of multiplexed signals. A logical sum for detecting the flag is changed in response to a supplied signal.

As a result, a synchronization circuit which is flexibly responsive to the change in data format can be formed.

In such a manner, the present invention provides a synchronization circuit with correlated signal which is also stable in the telecommunication system having a non-multiplexed and multiplexed signal portions.

Alternatively, all timing relationships may be provided as transmission data in lieu of storing them in the storing unit 10. This can be implemented by incorporating all necessary data in the simplex signal portion. In this case, the receiver would include means for holding the data in lieu of the storing unit 10, so that it controls each unit.

Now, a fifth embodiment of the present invention will be described.

As mentioned in the foregoing embodiments, a flag is set in a period of three chips delay interval when the number of signals to be multiplexed is 5. The delay interval is 6, 5 chip when the number of signals to be multiplexed is 2. Synchronization can be readily achieved in a method using correlation spikes. Necessity to provide shift registers for 6 chips (18 samples) is omitted so that the circuit scale can be reduced.

Therefore, in accordance with the present invention selection is made between a method for alternatively counting 5 and 6 chips as is done in the prior art in which the detection flag set for synchronization is selected among correlation spikes and a method for selecting a flag in which the delay interval is predetermined.

Figure 19:
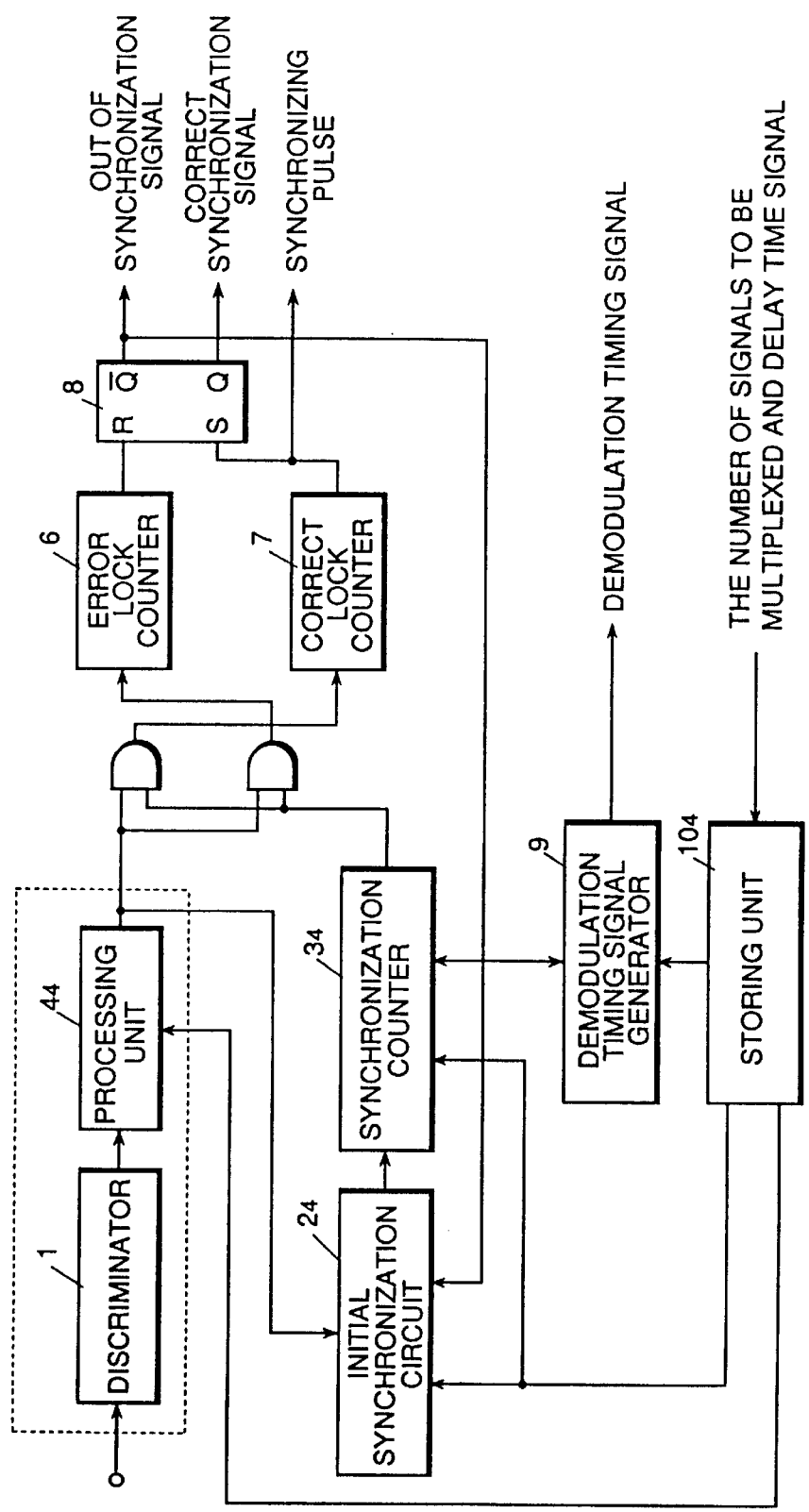
FIG. 19 is a circuit block diagram showing a further embodiment of the synchronization circuit with correlated signal of the present invention.

FIG. 19 shows the configuration of the present embodiment.

The fourth embodiment can be converted into the present embodiment by changing the manner of presetting so that counting is conducted to store data when the number of signals to be multiplexed is 2 (duplex) and the delay interval is used for setting a flag when the number of signals to be multiplexed is 5.

Accordingly, when this system is used about two flags may be set or only one flag may be set. Thus, it is necessary to change the control of the initial synchronization circuit $2_4$ and synchronization counter $3_4$ in response to a signal from the storing unit $10_4$.

The present invention brings following advantageous effect.

(1) In a prior art simply adopting a processing of a threshold of the correlation output, a synchronization relationship may be established in an erroneous manner when the number of samples is increased. In accordance with the present invention, a synchronization relationship can be determined by discriminating the highest correlated sample, that is, the median maximum of samples, which is obtained by threshold processing. Prior art problem can be overcome.

(2) A method has been conventionally adopted in which several synchronization flags are set in one period of the spread code in a multiplexing system. In the present invention, only one flag is set in one period of the code by adopting a method using a flag which is set with reference to a delay interval which is uniquely preset as the delay interval preset in the multiplexing block. Accordingly, the synchronization characteristics can be enhanced.

(3) In addition to the advantageous effect of (2) above, an advantageous effect similar to the advantageous effect of (1) above can be performed by establishing a synchronization relationship to accommodate a way of taking a given number of samples per one chip on correlation processing of the spread signals. Synchronization characteristic can be further improved.

(4) In addition to advantageous effects of (2) and (3) above, by conducting an initial synchronization in only a predetermined data pattern portion, synchronization in an unwanted portion can be prevented and the operation period of time of the circuit can be shortened, resulting in a low consumption of power.

(5) In a system comprising a non-multiplexed portion and multiplexed portion, the correlated signal per se or the synchronizing signal which is obtained by means according to the present invention firstly mentioned is used as a reference for correlation synchronization in the non-multiplexed portion while a flag is set with reference to the delay interval according to the present invention secondly mentioned in the multiplexed portion. This causes only one flag to be set in one period of the spreading in both non-multiplexed portion and multiplexed portion. The feature of the means of the present invention can be advantageously used also in such system.

(6) In addition to advantageous effects of (2) through (5) above, a synchronization relationship can be established in one period of spread code for any number of signals to be multiplexed or delay time by selecting corresponding data from said storing means if the signal has a data format which is capable of changing the number of multiplexed signals and delay time. A synchronization relationship can be stably established even if the number of the signals to be multiplexed changes so that demodulation can be conducted without any error.

(7) In addition to advantageous effect of (6) above, a data representing a timing relationship is embedded in a non-multiplexed portion as a data. A flexible presetting can be achieved by generating a timing signal representative of the leading edge of the multiplexed portion by using this data.

(8) Best synchronizing scheme can be used depending upon the number of the signals to be multiplexed by determining based upon data from the storing means or transmitting/receiving means whether counting method of delay interval flag is used for synchronization depending upon the number of signals to be multiplexed.

Further, the circuit which is provided when the number of the signals to be multiplexed is small can be reduced in scale by determining whether the correlation output, according to the present invention firstly mentioned or the flag of according to the present invention secondly mentioned is used for synchronization depending upon the number of the signals to be multiplexed.

What is claimed is:

1. A synchronization circuit with correlated signal in a direct spread spectrum telecommunication system for taking a given number of samples per one chip of spread signal which are directly spread in accordance with a spread code, including a circuit for determining a correlation between the signal based upon the obtained sample values and the spread code and a circuit for generating a synchronization signal in response to the resultant correlated signal input thereto, wherein the circuit for generating a synchronization signal comprises:

a comparing and determining means for determining by comparing the correlated signal with a predetermined threshold and median maximum discriminating means for outputting a flag representing where a median sample is larger in amplitude than previous and subsequent samples along successive odd number of samples of the correlated signal, whereby a synchronization signal with correlation is generated based upon an output which is generated when the comparing and determining means determines that the correlated signal exceeds the predetermined threshold and the flag is set by the median maximum discriminating means.

2. A synchronization circuit with correlated signal in a direct spread spectrum telecommunication system including a circuit for determining a correlation between a spread code and multiplexed signals obtained by delaying spread signals which are directly spread in accordance with the spread code and by multiplexing a plural series of signals having at least two kinds of delay intervals by a desired number of chips and a circuit for generating a synchronization signal in response to the obtained correlated signal input thereto, wherein the circuit for generating a synchronization signal comprises:

a processing unit for determining whether one of the input correlated signals has a unique delay interval so as to set a flag, whereby a synchronization signal is generated with reference to the flag.

3. A synchronization circuit with correlated signal in the direct spread spectrum telecommunication system of claim 2 for taking a given number of samples per one chip of spread signal, wherein the circuit for generating a synchronization signal generates the synchronization signal by using an obtained correlated signal based upon the sample values, the circuit for generating a synchronization signal comprising a comparing and determining means for comparing a value of the correlated signal with a preset threshold and a median maximum discriminating means for setting a flag when the median of the consecutive odd number of samples of the correlated signal is larger than values of previous and subsequent samples, whereby an output issued when the comparing and determining means determines that the correlated signal exceeds the threshold and a flag is set by the median maximum discriminating means are input to the processing unit.

4. A synchronization circuit with correlated signal in the direct spread spectrum telecommunication system of claim 2, wherein the circuit for generating a synchronization signal conducts an initial synchronization in accordance with only a given data pattern portion of a predetermined data format.

5. A synchronization circuit with correlated signal in the direct spread spectrum telecommunication system of claim 2, wherein the circuit for generating the synchronization signal includes a storing means for storing data representative of the number of the signals to be multiplexed, the delay intervals which are different for delay time and a timing relationship of a leading edge of the multiplexed block corresponding to a position at which the flag is set, and wherein the circuit for generating the synchronization signal adjustably generates a signal representing the timing relationship with the leading edge of the multiplexing block in accordance with the data which is selected from the storing means in response to the data on the number of signals to be multiplexed and the delay time.

6. A synchronization circuit with correlated signal in the direct spread spectrum telecommunication system of claim 5, wherein the circuit for generating the synchronization signal generates a signal representative of the timing relationship with the leading edge of the multiplexed block by using data representative of the different delay intervals or the timing relationships which are embedded in a simplex portion of the data format.

7. A method of generating a synchronization signal with correlation in a direct spectrum telecommunication system, the method comprising:

taking a given number of samples per one chip of spread signal which are spread in accordance with a spreading code;

receiving a correlated signal at a synchronization signal generation circuit;

comparing the received correlated signal with a threshold using the synchronization signal generation circuit and outputting a flag indicative of where a sample is larger in amplitude than previous and subsequent samples; and generating a synchronization signal with correlation based upon an output resulting from said comparing step and whether the flag has been set.

8. A method of generating a synchronization signal in a spread spectrum telecommunication system, the method comprising the steps of:

determining at least one correlation signal between at least one spreading code and multiplexed signals, the multiplexed signals being obtained by delaying spread signals and by multiplexing plural series of signals having different delay intervals;

providing a synchronization signal generation circuit;

receiving the correlation signals via the synchronization signal generation circuit;

determining whether one of the received correlated signals has a different delay interval relative to other received correlated signals using the synchronization signal generation circuit; and generating a synchronization signal at least based upon whether it has been determined that one of the correlated signals has a different delay interval than other received correlated signal.

9. A synchronization circuit with correlated signal in a direct spread spectrum telecommunication system having a correlation circuit for determining a correlation between a spread code and spread signal spread in accordance with the spread code and for generating correlation synchronization signals, said synchronization circuit comprising:

a circuit for generating a synchronization signal, said circuit comparing a correlated signal with a predetermined threshold and outputting a flag when a median sample is larger in amplitude than previous and subsequent samples along successive odd numbers of samples of the correlated signal, so that a synchronization signal with correlation is generated based at least in part upon determining that the correlated signal exceeds the predetermined threshold and the outputting of the flag.

* * * * *